United States Patent Office 3,422,190
Patented Jan. 14, 1969

3,422,190
AROMATIC ISONITRILE PEST CONTROLLING AGENTS
Ivar Ugi and Uwe Fetzer, Leverkusen, and Gunter Unterstenhofer, Opladen, Wolfgang Behrenz, Wuppertal-Elberfeld, Paul-Ernst Frohberger, Burscheid, and Hans Scheinpflug, Leverkusen, Germany, assignors to Farbenfabriken Bayer Aktiengesellschaft, Leverkusen, Germany, a German corporation
No Drawing. Filed Dec. 3, 1963, Ser. No. 327,824
Claims priority, application Germany, Dec. 17, 1962,
F 38,570
U.S. Cl. 424—226           15 Claims
Int. Cl. A01n 9/20

The present invention concerns the use of aromatic isonitriles, some of which are novel, for controlling pests.

It has already been disclosed that aliphatic and araliphatic isonitriles with 13–25 carbon atoms can be used as insecticides (U.S. Patent No. 3,012,932).

It has now been found that aromatic isonitriles of the general formula

$$A\!-\!N\!\!\equiv\!\!C \qquad\qquad (I)$$

wherein A denotes an optionally substituted aromatic radical, exhibit strong biocidal properties and can for this reason be employed as pest control agents.

It is distinctly surprising that the compounds according to the invention should exhibit biocidal activities which are appreciably more intensive and also more diverse than those of the aliphatic and araliphatic isonitriles with 13–25 carbon atoms which are at present known in technology and which merely exhibit insecticidal properties. Thus, a 0.2% solution of 2-methyl-3-chloro-phenyl isocyanide according to the invention has a 100% systemic activity towards *Sitobium granarium* after it has acted for 24 hours whereas the previously known n-octadecyl isocyanide does not exhibit any activity whatever.

The compounds to be employed according to the invention are clearly characterised by the above Formula I. The term "aromatic radicals" within the scope of the invention applies not only to those aromatic radicals which are built up exclusively from a carbon skeleton but also to these aromatic radicals which contain heteroatoms.

In Formula I, A preferably denotes phenyl, naphthyl, phenanthrenyl, pyridyl, pyrimidyl, quinolyl, indolyl, diphenylene-oxide, tetralyl, and dibenzofuranyl radicals.

The aromatic radicals may also be substituted. They preferably contain 1 to 5 substituents from the following groups:

Alkyl and cycloalkyl radicals with 1 to 12 carbon atoms, hydroxyl groups, alkoxy, aryloxy, alkylmercapto, arylmercapto, alkylcarboxy, arylcarboxy, carboxylic acid ester, carboxylic acid amide, urethane, sulphone, sulphenamide, nitro, trifluoro-methyl, polyhalobicyclo-phenyl, arylazo, and nitrile groups. In addition, the aromatic radicals may also be substituted by halogen atoms, preferably chlorine and bromine.

The following may be detailed as examples for the compounds according to the invention:

2,6-dimethyl-phenyl,
2,6-diisopropyl-phenyl,
mesityl,
2,6-diethyl-4-methyl-phenyl,
2-methyl-3-chloro-phenyl,
6-chloro-phenyl,
2-methyl-4-chloro-6-ethyl-phenyl,
2,4,5-trichloro-phenyl,
2,4-dimethoxy-phenyl,
2,5- and 3,4-dimethoxy-phenyl,
2,4-dimethoxy-5-chloro-phenyl,
2-methoxy-5-ethylsulphonyl-phenyl,
2-methoxy-5-phenylsulphonyl-phenyl,
2-methoxy-5-(di-N,N-n-butyl-sulphonamide)-phenyl,
3-methyl-4-diphenylyl,
2,3- and 3,4-tetramethylene-phenyl,
3- and 4-nitro-phenyl,
3-nitro-4,6-dimethyl-phenyl,
2-methoxy-5-nitrophenyl,
2-hydroxy-3-nitro-5-chloro-phenyl,
2-methoxy-4-nitro-phenyl,
4-carbethoxy-phenyl,
2-methyl-3-nitro-phenyl,
α- and β-naphthyl,
3-benzoyl-phenyl,
3-methoxy-diphenyl-oxide-(2),
1,2,4-triazolyl-(4), and 1-(p-chlorophenyl)-3,5-dimethyl-4-pyrazolyl isocyanide as well as 1-(4-isocyano-phenyl)-3,5-dimethyl-4-nitroso-pyrazole.

The novel aromatic isonitriles may be prepared by treating formylamides of the following formula

$$A\!-\!NH\!-\!CHO \qquad\qquad (II)$$

wherein A has the same significance as stated above, with water-eliminating agents in the presence of bases. During this process, the formylamides are converted to the isonitriles by means of the elimination of water.

The starting materials required for the preparation of the aromatic isonitriles according to the invention are precisely characterised by Formula II. Some of these are again novel. Such formamides may however be prepared simply according to known methods by heating the corresponding known amines with formic acid under reflux for 1 to 10 hours. The formamides already crystallise on cooling. If this does not happen, the reaction solution is concentrated somewhat until crystallisation occurs. The crystals are filtered off with suction, dried thoroughly, and finely powdered. They can be employed in this form for the preparation of the aromatic isonitriles according to the invention.

Characteristic amine pre-precursors may be found, for instance, in Beilstein, vol. 16, page 344, 1933, and also in U.S. Patent 2,673,172.

Hydrocarbons, for instance benzene and benzine, chlorinated hydrocarbons such as methylene chloride, ethers such as dioxane, and esters such as ethyl acetate may be employed as solvents during the preparation of the isonitriles according to the invention. Phosgene is mainly employed as the water-eliminating agent, but other acid chlorides such as phosphorus oxychloride, benzene-sulphonyl chloride, and cyanuric chloride may also be used.

Pyridine, triethylamine, or potassium tert. butoxide are conveniently selected as the bases.

The reaction temperatures are between 0 and 100° C., preferably between 0 and 20° C.

The aromatic isonitriles are obtained in a particularly simple manner when the corresponding aryl-formamides are first introduced together with triethylamine in methylene chloride, and phosgene is then passed into this mixture. In order to work up the reaction mixture, it is treated with water, the organic phase is separated, and it is then subjected to a vacuum distillation. Representative examples for the production of the novel aromatic isonitriles have been given among the examples of preparation. In addition, examples for the production of aryl-formamides have also been given there.

The aromatic isonitriles according to the invention have strong biocidal properties. They are particularly suitable for application as insecticides, nematocides, acaricides, and fungicides. Thus, they are for instance effective towards insects such as flies, mosquitoes, beetles, and greenflies, and towards mites and nematodes.

The following may be mentioned as example of insects which can be controlled with the substances according to the invention:

Greenflies of the species *Myzodes persicae* and *Doralis fabae*, flies of the species *Musca domestica* and *Drosophila melanogaster*, as well as the Colorado beetle (*Leptinotarsa decemlineata*), ampher beetles (*Gastrophysa viridula*), Oriental cockroaches (*Periplaneta orientalis*), and crickets (*Gryllus domesticus*).

*Tetranychus telarius* may be mentioned as a representative of the mites, and *Meloidogyne incognita* as a representative of the nematodes.

Their fungicidal activity in particular extends to phytopathogenic fungi, for instance *Rhizoctonia solani*.

The compounds according to the invention may be applied by themselves or as compositions made up by the normal method. The compositions may be suspensions, dispersions, powders, or dusting powders. They are prepared by the usual method with the aid of the normal extenders, diluents, and emulsifying agents.

The biocidal properties of the aryl isocyanides according to the invention are reproduced below by reference to some examples. Thus, 0.2% aqueous solutions of 2,6-dimethyl-phenyl isocyanide and 3-methyl-2-chloro-phenyl isocyanide cause 100% destruction of flies of the species *Drosophila melanogaster* within 24 hours.

When applied at a concentration of 0.05%, 2,4,5-trichloro-phenyl isocyanide reduces the infestation of *Piricularia orycae* on rice to 25% of the infestation on an untreated control.

The following Table 1 specifies the activity of 6 aromatic isonitriles according to the invention towards insects.

The tests were carried out by the usual method. The required aqueous suspensions are prepared by taking up the active agent in about its own weight of dimethylformamide, adding a little of the emulsifying agent, and diluting this concentrate to the desired concentrations.

TABLE 1

| Isonitrile | Common fly *Musca domestica* | | Mosquitoes *Aedes aegypti* | | Grain weevils *Calandra granaria* | | Fly maggots *Musca domestica* | | Mosquito larvae *Aedes aegypti* larve | |
|---|---|---|---|---|---|---|---|---|---|---|
| | Conc. (percent) | TL100 | Conc. (percent) | TL100 | Conc. (percent) | Activity (percent) | Conc. (percent) | Activity (percent) | Conc. (percent) | Activity (percent) |
| 2,4-dimethoxy-phenyl | 0.1 | 240' | 0.1 | 60' | 0.1 | 100 | 0.1 | 100 | 0.01 | 100 |
| | | | 0.01 | 3 h | 0.01 | 100 | | | 0.001 | 50 |
| | | | 0.001 | >3 h | 0.001 | 0 | | | | |
| 2,5-dimethyoxy-phenyl | 0.1 | 100' | | | 0.1 | 100 | | | | |
| | 0.01 | >8 h | | | 0.01 | 0 | | | | |
| 2-methoxy-5-chlorophenyl | 0.1 | 3 h | 0.1 | 60' | | | | | | |
| | 0.01 | >8 h | | | | | | | | |
| 2,6-dimethylphenyl | 0.1 | 40' | 0.1 | 60' | 0.1 | 100 | | | | |
| | 0.01 | >0 8h | 0.01 | >3 h | | | | | | |
| 2-methyl-3-chlorophenyl | 0.1 | 40' | 0.1 | 60' | 0.1 | 100 | | | | |
| | 0.01 | >8 h | 0.01 | 180' | 0.01 | 0 | | | | |
| | | | 0.001 | >3 h | | | | | | |
| 3-methyl-4-cyclohexylphenyl | 0.1 | 3 h | 0.1 | 60' | 0.1 | 100 | | | 0.01 | 100 |
| | 0.01 | >8 h | 0.01 | >3 h | 0.01 | 60 | | | 0.001 | 80 |

TABLE 2

(1) Activity of aromatic monoisonitriles towards *Tetranychus telarius* (green, resistant, percent destruction)

| Isonitrile | Concentration in p.p.m. | | | Ovi-cidal |
|---|---|---|---|---|
| | 2,000 | 200 | 20 | |
| $O_2N$–⟨phenyl, $OCH_3$⟩–NC | 100 | 95 | 0 | — |
| $O_2N$–⟨phenyl, $CH_3$, $OCH_3$⟩–NC | 100 | 90 | 0 | — |
| $O_2N$–⟨phenyl, $CO_2CH_3$⟩–NC | 100 | 0 | 0 | + |
| ⟨phenyl⟩–N=N–⟨phenyl⟩–NC | 100 | 100 | 0 | — |
| Cl–⟨phenyl⟩–O–⟨phenyl, NC⟩–Cl | 100 | 40 | 0 | + |
| ⟨phenyl, $CH_3$⟩–N=N–⟨phenyl, $CH_3$⟩–NC | 100 | 100 | 0 | — |

(2) Spore germination of *Tilletia tritici* (O=complete inhibition; V=no inhibition) by aromatic monoisonitriles 1 g./kg. of seed material

| Isonitrile | Dry dressing, isonitrile content as percent | | | |
|---|---|---|---|---|
| | 30% | 10% | 3% | 1% |
| $O_2N$–⟨phenyl⟩–NC | I | | | |
| ⟨phenyl, $CH_3$, $NO_2$⟩–NC | I | | | |

TABLE 2—Continued

| Isonitrile | Dry dressing, isonitrile content as percent | | | |
|---|---|---|---|---|
| | 30% | 10% | 3% | 1% |
| CH₃O—⌬—NC, OCH₃ | I | | | |
| CH₃—⌬(CH₃)—NC, O₂N | I | | | |
| O₂N—⌬—NC, OCH₃ | I | II | III | |
| O₂N—⌬—NC, CO₂CH₃ | I | III | | |
| O₂N—⌬(CH₃)—NC, OCH₃ | I | II | III | |
| O₂N—⌬(CH₃O)—NC, OCH₃ | I | | | |
| O₂N—⌬(C₂H₅O)—NC, OC₂H₅ | I | | | |

(3) Activity of aromatic monoisonitriles towards grain weevils (percent destruction).

| Isonitrile | Concentration, percent | | |
|---|---|---|---|
| | 0.1 | 0.01 | 0.001 |
| CH₃O—⌬—NC, OCH₃ | 100 | 100 | 0 |
| Cl—⌬(CH₃)—NC, OCH₃ | 100 | 100 | 0 |
| H—⌬—⌬—NC | 100 | 100 | |
| ⌬—⌬(NC) | 100 | 100 | |
| naphthyl-NC | 100 | 100 | |

TABLE 2—Continued (4) Activity of aromatic monoisonitriles towards mosquito larvae (percent destruction)

| Isonitrile | Concentration in percent | | |
|---|---|---|---|
| | 0.001 | 0.0001 | 0.00001 |
| Cl—⌬—NC, OCH₃ | 90 | 0 | 0 |
| Cl—⌬—NC, OCH₃ | 100 | 100 | 40 |
| ⌬—⌬(NC) | 100 | 0 | 0 |
| naphthyl-NC | 100 | 0 | 0 |

(5) Activity of aromatic isonitriles towards Oriental cockroaches (percent destruction)

| Isonitrile | Concentration, percent | |
|---|---|---|
| | 0.1 | 0.01 |
| ⌬—⌬(NC) | 100 | 0 |

(6) Systemic activity of aromatic monoisonitriles towards *Rhopalosiphon spec.* (percent destruction)

| Isonitrile | Concentration, percent | |
|---|---|---|
| | 0.2 | 0.02 |
| naphthyl-NC | 100 | 0 |

(7) Activity of aromatic monoisonitriles towards *M. persicae* (percent destruction)

| Isonitrile | Concentration, percent | |
|---|---|---|
| | 0.2 | 0.02 |
| CH₃—⌬(CH₃)—NC, C₂H₅ | 100 | 50 |
| H—⌬—⌬—NC, CH₃ | 100 | 50 |
| naphthyl-NC | 100 | 50 |

TABLE 2—Continued

**(8) Activity of aromatic monoisonitriles towards *Plutella maculipennis* (percent destruction)**

| Isonitrile | Concentration, Percent | | Feed deterrent effect |
|---|---|---|---|
| | 0.2 | 0.02 | |
| CH₃O—⌬—NC (with OCH₃) | 100 | 30 | — |
| CH₂O—⌬—NC (with OCH₃) | 100 | 90 | — |
| Cl—⌬—NC (with CH₃, OCH₃) | 100 | 30 | + |
| H—⌬—⌬—NC (with CH₃) | 100 | 100 | — |

**(9) Activity of aromatic monoisonitriles towards *Drosophila***

| Isonitrile | Concentration percent | |
|---|---|---|
| | 0.2 | 0.02 |
| O₂N—⌬—NC | 100 | 0 |
| O₂N—⌬—NC | 100 | 0 |
| ⌬—NC (with 2 CH₃) | 100 | 0 |
| Cl—⌬—NC (with CH₃) | 100 | 0 |
| Cl—⌬—NC (with OCH₃) | 100 | 0 |
| Cl—⌬—NC (with OCH₃) | 100 | 0 |
| ⌬—NC (with 2 CH(CH₃)₂) | 100 | 0 |
| naphthyl—NC | 100 | 0 |

**(10) Activity of aromatic monoisonitriles towards *Botrytis cinerea* (separated leaves)**

| Isonitrile | |
|---|---|
| CH₃—⌬—NC (with CH₃, NO₂) | No infestation at 1 p.p.m. |

**(11) Activity of aromatic monoisonitriles towards *Piricularia crycae* (percent infestation; untreated control=100%)**

| Isonitrile | 0.05% Spray liquor | 0.1% Dusting agent |
|---|---|---|
| CH₃O—⌬—NC (with NO₂) | 5 | 20 |
| O₂N—⌬—NC (with CH₃, OCH₃) | 2 | 33 |

**(12) Activity of aromatic monoisonitriles towards *Phytophthora infestans* (percent infestation)**

| Isonitrile | Concentration in p.p.m. | | |
|---|---|---|---|
| | 250 | 62 | 31 |
| CH₃O—⌬—NC (with Cl, OCH₃) | ----- | 12 | 54 |
| C₂H₅—SO₂—⌬—NC (with OCH₃) | 26 | 44 | ----- |

**(13) Activity of aromatic monoisonitriles towards *Erysiphe spec.* (on cucumbers, percent infestation)**

| Isonitrile | Concentration, p.p.m. | | Comparison with standard |
|---|---|---|---|
| | 250 | 62 | |
| hexachloronorbornenyl—⌬—NC | 0 | 0 | + |

TABLE 2—Continued

(14) Fungicidal and fungistatic activity of aromatic monoisonitriles towards disease-causing organisms living in seeds and the soil (agar-agar plate test; inhibition of mycelium growth at the concentrations expressed in p.p.m.).

| Isonitrile | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|
| 4-O₂N-C₆H₄-NC | 10 | 100 | 100 | 10 | 10 | 100 | 100 | 100 |
| O₂N-C₆H₄-NC (para) | 100 | 100 | 100 | 100 | 100 | 100 | 100 | 100 |
| 2-CH₃, 3-NO₂-C₆H₃-NC | 100 | 100 | 100 | 100 | 100 | 100 | 100 | 100 |
| CH₃, O₂N-C₆H₃-NC | 10 | 100 | 100 | 100 | 10 | 100 | 100 | 100 |
| O₂N, CH₃-C₆H₃-NC | 10 | 100 | 100 | 10 | 10 | 100 | 100 | 100 |
| CH₃O, NO₂-C₆H₃-NC | 10 | 100 | 100 | 10 | 10 | 100 | 100 | 100 |
| O₂N, OCH₃-C₆H₃-NC | 10 | 100 | 100 | 100 | 10 | 100 | 100 | 100 |
| Cl, OCH₃-C₆H₃-NC | 100 | 100 | 100 | 100 | 10 | 100 | 100 | 100 |
| Cl, OCH₃-C₆H₃-NC | 10 | 100 | 100 | 100 | 10 | 100 | 100 | 100 |
| CH₃O, CH₃-C₆H₃-NC | 10 | 100 | 100 | 10 | 100 | 100 | 100 | 100 |
| O₂N, COOCH₃-C₆H₃-NC | 100 | 100 | 100 | 100 | 100 | 100 | 100 | 100 |
| O₂N, CH₃, CH₃-C₆H₂-NC | 10 | 100 | 100 | 10 | 10 | 100 | 100 | 100 |
| NO₂, CH₃, CH₃-C₆H₂-NC | 10 | 10 | 10 | 10 | 10 | 100 | 100 | 100 |
| Cl, OCH₃, Cl, Cl-C₆H-NC | 100 | 100 | 100 | 100 | 100 | 100 | 100 | 100 |

TABLE 2—Continued

| Isonitrile | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|
| Cl-C₆H₃(Cl)-O-C₆H₅ with NC | 10 | 100 | 100 | 100 | 10 | 100 | 100 | 100 |
| 1-Naphthyl-NC | 10 | 100 | 100 | 100 | 10 | 100 | 100 | 100 |
| 5,6,7,8-Tetrahydro-1-naphthyl-NC | 10 | 100 | 100 | 100 | 10 | 100 | 100 | 100 |

(15) Toxicity of aromatic monoisonitriles towards warm-blooded creatures.

| Compound | Largest dose which was survived, in mg./kg. (mouse) | |
|---|---|---|
| | Peroral | Subcutaneous |
| 2,6-diisopropylphenyl-NC | 100 | 100 |
| 2-Cl-4-CH₃-phenyl-NC | 250 | 100 |
| 2,3-dichlorophenyl-NC | 1,000 | 500 |
| 3,5-dichlorophenyl-NC | 2,000 | 500 |
| 5-Cl-2-OCH₃-phenyl-NC | 500 | 250 |
| 4-Cl-2-CF₃-phenyl-NC | 5,000 | 1,000 |
| 3,5-bis(CF₃)phenyl-NC | 5,000 | 1,000 |

TABLE 2—Continued

| Compound | Largest dose which was survived, in mg./kg. (mouse) | |
|---|---|---|
| | Peroral | Subcutaneous |
| 3-NO₂-phenyl-NC | 5,000 | 1,000 |
| 4-NO₂-phenyl-NC | 5,000 | 250 |
| 2-NO₂-6-CH₃-phenyl-NC | 5,000 | 1,000 |
| 2-CH₃-4-NO₂-phenyl-NC | 2,000 | 500 |
| 4-NO₂-2-CH₃-phenyl-NC | 500 | 250 |
| 2-CH₃-4-NO₂-6-CH₃-phenyl-NC | 500 | 1,000 |

TABLE 2—Continued

| Compound | Largest dose which was survived, in mg./kg. (mouse) | |
|---|---|---|
| | Peroral | Subcutaneous |
| (CH₃, CH₃, NO₂, NC structure) | 2,000 | 500 |
| (O₂N, OCH₃, NC structure) | 2,000 | 500 |
| (NO₂, OCH₃, NC structure) | 500 | 500 |
| (NO₂, CH₃, CH₃O, NC structure) | 250 | 500 |
| (NO₂, CH₃O, OCH₃, NC structure) | 500 | 1,000 |
| (COOC₂H₅, NC structure) | 5,000 | 1,000 |
| (O₂N, COOCH₃, NC structure) | 1,000 | 250 |
| (NC, naphthyl structure) | 100 | 50 |
| (Cl, O, Cl, NC structure) | 5,000 | 1,000 |
| (Cl₆ bicyclic with phenyl-NC) | 5,000 | 1,000 |

TABLE 2—Continued

| Compound | Largest dose which was survived, in mg./kg. (mouse) | |
|---|---|---|
| | Peroral | Subcutaneous |
| 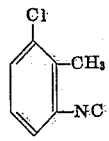 | 1,000 | 1,000 |
| (phenyl-N=N-phenyl-NC) | 1,000 | 500 |

The following examples are given for the purpose of illustrating the invention.

EXAMPLE 1

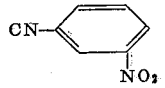

170 parts by weight of 2-methyl-3-chloro-formanilide, 230 parts by weight of triethylamine and 800 parts by weight of methylene chloride are introduced first of all. 100 parts by weight of phosgene are passed in whilst cooling with ice and stirring. After 500 parts by weight of water have been added, the product is separated, dried over potassium carbonate, filtered, and distilled in vacuo. Yield: 125 parts by weight of 2-methyl-3-chloro-phenyl isocyanide of B.P. 68–70° C./0.15 mm. Hg.

EXAMPLE 2

(CN-phenyl-NO₂ structure)

45 parts by weight of m-nitro-formanilide, 25 parts by weight of triethylamine and 150 parts by weight of methylene chloride are introduced first of all. A solution of 27 parts by weight of phosgene in 50 parts by weight of methylene chloride is added dropwise, whilst cooling with ice and stirring. It is worked up by adding 200 parts by weight of water, separating, and evaporation in vacuo at 20–30° C. Yield: 38 parts by weight of m-nitro-phenyl isocyanide, M.P. 72–75° C.

The m-nitro-formanilide employed as the starting material is prepared by boiling m-nitraniline with formic acid for several hours, concentrating the reaction solution, and allowing it to cool. The precipitated crystals are filtered off with suction, dried thoroughly, and reduced to a fine powder.

EXAMPLE 3

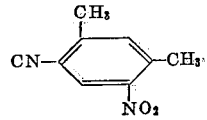

265 parts by weight of 2,4-dimethyl-5-nitro-formanilide (M.P. 190–192° C.), 300 parts by weight of triethylamine and 700 parts by weight of methylene chloride are introduced first of all. 136 parts by weight of phosgene are passed in whilst cooling with ice and stirring. When the reaction has been completed, 500 parts by weight of water are added, the product is separated, evaporated in vacuo at 20–30° C., and the residue is recrystallised from ethyl acetate. Yield: 110 parts by weight of 2,4-dimethyl-5-nitro-phenyl isocyanide of M.P. 77–78° C.

EXAMPLE 4

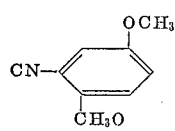

57 parts by weight of phosgene are passed into a mixture of 103 parts by weight of 2,5-dimethoxy-formanilide, 135 parts by weight of triethylamine and 500 parts by weight of methylene chloride, whilst stirring and cooling with ice. It is treated with water, the organic phase is separated, evaporated in vacuo at 20–30° C., and the residue is recrystallised from ligroin. Yield: 60 parts by weight of 2,5-dimethoxy-phenyl isocyanide. M.P. 64–65° C.

2,5-dimethoxy-formanilide is prepared by boiling 2,5-dimethoxy-aniline with formic acid for several hours. The desired product separates on cooling. Its melting point is 77 to 79° C.

EXAMPLE 5

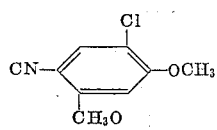

50 parts by weight of phosgene are passed at 0–15° C. into a mixture of 110 parts by weight of 2,4-dimethoxy-5-chloro-formanilide (M.P. 185–186° C.), 120 parts by weight of tri-ethylamine and 300 parts by weight of methylene chloride, whilst stirring. Water is added, the product is separated, evaporated in vacuo at 20–30° C., and the residue is recrystallised from toluene. Yield: 48 parts by weight of 2,4-dimethox-5-chloro-phenyl isosyanide. M.P. 109–110° C.

EXAMPLE 6

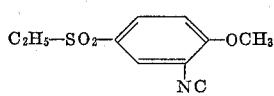

60 parts by weight of ethyl-(3-formylamino-4-methoxyphenyl)-sulphone, 60 parts by weight of triethylamine and 200 parts by weight of methylene chloride are introduced first of all. 25 parts by weight of phosgene, as a solution in 40 parts by weight of methylene chloride, are added dropwise at 0–15° C. whilst stirring. It is advisable to carry out the dropwise addition with the aid of a dropping funnel dipping into the reaction mixture. 150 parts by weight of water are added when the reaction has been completed, the organic phase is separated, dried over anhydrous potassium carbonate, filtered, evaporated in vacuo at 20–30° C., and the residue is recrystallised from toluene. Yield: 44 parts by weight of 3-ethylsulphonyl-6-methoxy-phenyl isocyanide. M.P. 106–108° C.

Ethyl - (3 - formylamino - 3 - methoxy - phenyl) - sulphone is prepared by boiling the corresponding amine with formic acid for several hours. The product is obtained on concentrating and cooling the reaction solution, in the form of crystals of melting point 137–139° C.

EXAMPLE 7

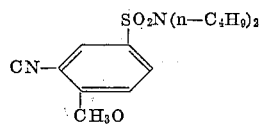

85 parts by weight of 3-formylamino-4-methoxybenzene-sulphonic acid di-n.butylamide, 60 parts by weight of triethylamine and 200 parts by weight of dry dioxane are introduced first of all. 25 parts by weight of phosgene are passed in at 0–15° C., whilst stirring. 200 parts by weight of a concentrated aqueous solution of sodium carbonate and 200 parts by weight of toluene are added, the product is separated, dried over potassium carbonate, filtered, and evaporated in vacuo at about 30° C. 65 parts by weight of a brown oil remain, which largely consists of 3 - isocyano - 4 - methoxy-benzene-sulphonic acid-di-n.butylamide.

EXAMPLE 8

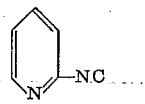

100 parts by weight of phosgene are passed into a mixture of 120 parts by weight of α-pyridyl-formamide, 100 parts by weight of triethylamine and 250 parts by weight of methylene chloride, the reaction is allowed to go to completion, air is blown through, 150 parts by weight of a concentrated solution of sodium carbonate are added, the organic phase is separated, and it is evaporated in vacuo at 20–30° C. when 59 parts by weight of crude α-pyridyl isocyanide remain as a brown oil.

α-Pyridyl-formamide is prepared by boiling α-aminopyridine with formic acid under reflux for several hours. When the solution has been evaporated and cooled, a liquid of boiling point 92 to 93° C./0.001 mm. Hg is obtained.

EXAMPLE 9

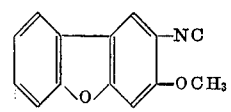

12.5 parts by weight of phosgene are passed into a mixture of 30 parts by weight of 2-formylamino-3-methoxy-di-phenylene-oxide, 30 parts by weight of tri-ethylamine and 150 parts by weight of methylene chloride. 50 parts by weight of water are added, the organic phase is separated, evaporated in vacuo, and the residue is recrystallised from benzene/benzine. Yield: 14 parts by weight of 2-isocyano-3-methoxy-diphenyleneoxide. M.P. 171–173° C. (decomp.).

EXAMPLE 10

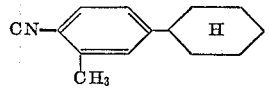

240 parts by weight of 2-methyl-4-cyclohexyl-formanilide (M.P. 132–133° C.), 240 parts by weight of triethylamine and 700 parts by weight of methylene chloride are introduced first of all. 110 parts by weight of phosgene are passed in, the reaction is allowed to go to completion, 500 parts by weight of water are added, the organic phase is separated and distilled in vacuo at B.P. 100–103° C./0.005 mm. Hg. Yield: 155 parts by weight of 2-methyl-4-cyclohexyl-phenyl isocyanide.

EXAMPLE 11

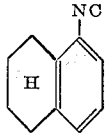

100 parts by weight of phosgene are passed at 0–15° C. into a mixture of 175 parts by weight of α-formylaminotetralin (M.P. 100–102° C.), 230 parts by weight of triethylamine, and 1500 parts by weight of methylene chloride, whilst stirring. Water is added, the product is separated and distilled in vacuo. Yield: 146 parts by weight of 2,3-tetramethylene-phenyl isocyanide. B.P. 119–123° C./0.02 mm. Hg.

EXAMPLE 12

(1) 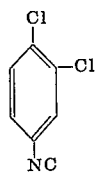

190 parts by weight of 3,4-dichloro-formanilide, 250 parts by weight of triethylamine and 600 parts by weight of methylene chloride are introduced first of all. 100 parts by weight of phosgene are passed in at a sufficiently fast rate for the temperature of the reaction mixture, which is stirred and cooled by means of a bath of ice and common salt, to amount to 5–15° C. It is subsequently heated at 30–40° C. for 10–15 minutes, a vigorous current of air is then passed through for 5–10 minutes, and it is treated with 1000 parts by weight of ice-water. The organic phase is separated, dried over anhydrous potassium carbonate and evaporated in vacuo at 20–30° C.

The residue is extracted with petroleum ether and this solution is evaporated in vacuo. Yield: 81 parts by weight of 3,4-dichloro-phenyl isonitrile. M.P. 32–33° C.

When an equivalent amount of other starting products is employed in place of the 190 parts by weight of 3,4-dichloroformanilide but the procedure is otherwise exactly in accordance with the above directions, the isonitriles specified below are obtained in the stated yields. Certain differences arise during the treatment of the resultant residues. Therefore, details are given of this operation in each case. The structural formula of the product is given first of all, then the treatment of the residue, and finally the yield.

(2) 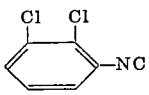

The residue cannot be distilled. Yield: 165 parts by weight of crude 2,3-dichloro-phenyl isocyanide.

(3) 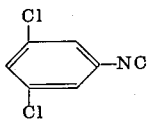

The residue cannot be distilled. Yield: 166 parts by weight of crude, oily 3,5-dichloro-phenyl isocyanide.

(4) 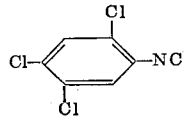

The residue is triturated with ethanol and filtered off with suction; it is then recrystallised from benzene/cyclohexane. Yield: 46 parts by weight of 2,4,5-trichlorophenyl isocyanide. M.P. 157–158° C.

(5) 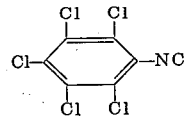

The residue is triturated with ligroin and filtered off with suction. Yield: 255 parts by weight of pentachloro-phenyl isocyanide. M.P. 184–186° C. (decomp.).

(6) 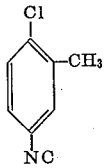

The residue is recrystallized from petroleum ether. Yield: 83 parts by weight of 3-methyl-4-chloro-phenyl isonitrile. M.P. 46–47° C.

(7) 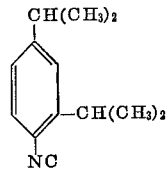

The residue is distilled in vacuo. Yield: 163 parts by weight of 2,4-diisopropyl-phenyl isocyanide. B.P. 71–74° C./0.02 mm. Hg.

(8) 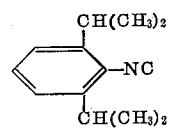

The residue is distilled in vacuo. Yield: 169 parts by weight of 2,6-diisopropyl-phenyl isocyanide. B.P. 95–97° C./0.55 mm. Hg.

(9) 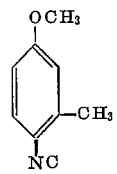

The residue is distilled in a high vacuum. Yield: 81 parts by weight of 2-methyl-4-methoxy-phenyl isonitrile. B.P. 68–69° C./0.001 mm. Hg.

(10) 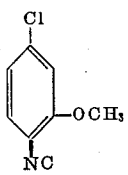

The residue is washed with ether until colourless. Yield: 109 parts by weight of 2-methoxy-4-chloro-phenyl isonitrile. M.P. 95–97° C.

(11) 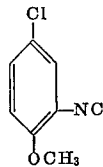

The residue is recrystallised from ligroin. Yield: 86 parts by weight of 2-methoxy-5-chloro-phenyl isonitrile. M.P. 75–76° C.

(12) 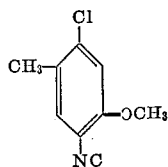

The residue is washed with ether. Yield: 117 parts by weight of 2-methoxy-4-chloro-5-methyl-phenyl isonitrile. M.P. 93–94° C.

(13) 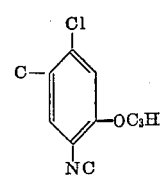

The residue is thoroughly washed with ether. Yield: 111 parts by weight of 2-methoxy-4,5-dichloro-phenyl isonitrile. M.P. 95–96° C.

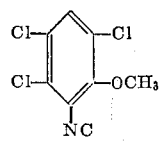

The residue is recrystallised from ligroin at −70° C. Yield: 156 parts by weight of 2,3,5-trichloro-6-methoxy-phenyl isonitrile. M.P. 93–95° C.

(15) 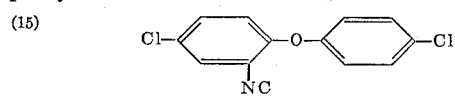

The residue is recrystallised from benzene. Yield: 228 parts by weight of 4,4′-dichloro-2-isocyano-diphenyl ether. M.P. 104–105° C.

(16) 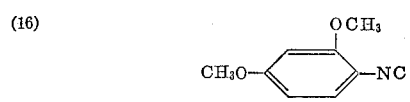

The residue is recrystallised from ligroin. Yield: 70 parts by weight of 2,4-dimethoxy-phenyl isocyanide. M.P. 67–68° C.

(17) 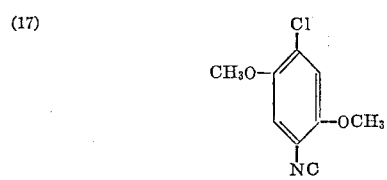

The residue is washed with ether. Yield: 154 parts by weight of 2,5-dimethoxy-4-chloro-phenyl isonitrile. M.P. 146–148° C.

(18) 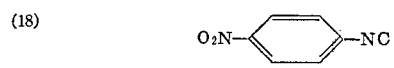

The residue is triturated with ether and filtered off with suction. Yield: 120 parts by weight of p-nitro-phenyl isocyanide. M.P. 95–97° C.

(19) 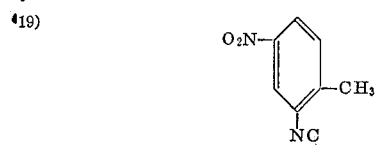

The residue is recrystallised from ligroin. Yield: 107 parts by weight of 2-methyl-5-nitro-phenyl isonitrile. M.P. 78–80° C.

(20) 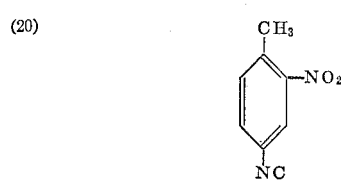

The residue is recrystallized from ligroin. Yield: 91 parts by weight of 3-nitro-4-methyl-phenyl isonitrile. M.P. 75–77° C.

(21) 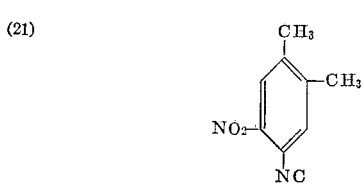

The residue is washed with ether/petroleum ether and recrystallized from ligroin. Yield: 103 parts by weight of 2,4-dimethyl-6-nitro-phenyl isonitrile. M.P. 50–52° C.

(22) 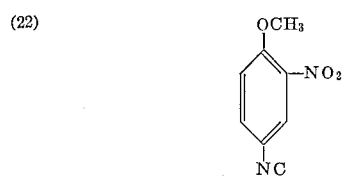

The residue is washed with ether/petroleum ether. Yield: 123 parts by weight of 2-nitro-4-methoxy-phenyl isonitrile. M.P. 91–92° C.

(23) 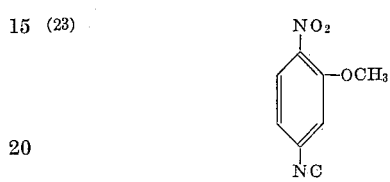

The residue is dissolved in chloroform and precipitated with petroleum ether. Yield: 117 parts by weight of 2-methoxy-4-nitro-phenyl isonitrile. M.P. 158–160° C.

(24) 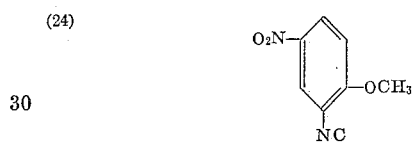

The residue is recrystallized from ligroin. Yield: 116 parts by weight of 2-methoxy-5-nitro-phenyl isonitrile. M.P. 100–101° C.

(25) 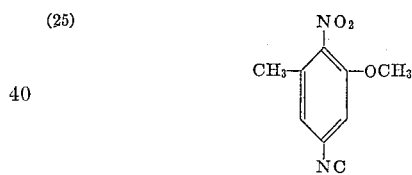

The residue is washed with ether. Yield: 161 parts by weight of 2-methoxy-4-nitro-5-methyl-phenyl isonitrile. Decomp. point 136° C.

(26) 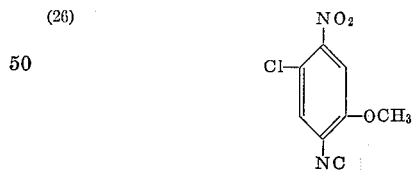

The residue is thoroughly rinsed with 80:20 ether/tetrahydrofuran. Yield: 136 parts by weight of 2-methoxy-4-nitro-5-chloro-phenyl isonitrile. M.P. 117–118° C.

(27) 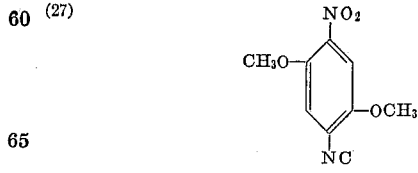

The residue is recrystallized from toluene. Yield: 186 parts by weight of 2,5-dimethoxy-4-nitro-phenyl isonitrile. Decomp. point 198° C.

(28) 

The residue is a brown oil which cannot be distilled.

Yield: 123 parts by weight of crude m-cyano-phenyl isocyanide.

(29)
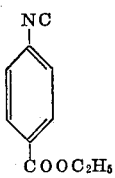

The residue is washed with ether/petroleum ether. Yield: 119 parts by weight of crude 4-isocyano-benzoic acid ethyl ester. M.P. 88–103° C.

(30)
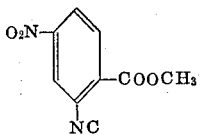

The residue is extracted with ether. 78 parts by weight of 2-isocyano-4-nitro-benzoic acid methyl ester remain after evaporation of the ether extracts. M.P. 68–70° C.

(31)
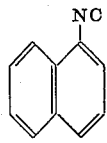

The residue is distilled in vacuo. Yield: 133 parts by weight of α-naphthyl isocyanide. B.P. 110–112° C./0.001 mm. Hg.

(32)
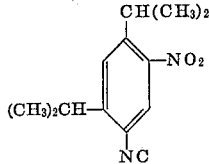

The residue is dissolved in petroleum ether and decanted from the resin. The compound crystallizes in the form of coarse plates on cooling to minus 76° C. M.P. 70–71° C. Yield: 142 parts by weight of 2,4-diisopropyl-5-nitrophenyl isonitrile.

We claim:
1. A method for combating pests which comprises contacting said pests with a pesticidal amount of a compound of the formula

wherein A is a member selected from the group consisting of a p-chlorophenoxy-m-chloro-phenyl, p-azobenzo-o-methyl-phenyl, p-cyclohexyl-o-methyl-phenyl, o,p-dimethyl-o-nitro-phenyl, naphthyl,

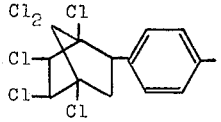

and

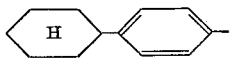

A being connected to the nitrogen atom from a ring carbon atom.

2. A pesticidal composition consisting essentially of a compound of the formula

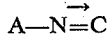

wherein A is a member selected from the group consisting of an o-chlorophenoxy-m-chlorophenyl, p-azobenzo-o-methyl-phenyl, o,p-dimethyl-o-nitrophenyl

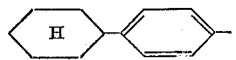

and

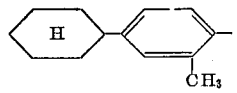

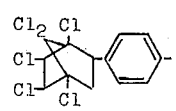

in combination with at least one member comprising a diluent, extender and emulsifying agent.

3. A method for combating pests which comprises applying to said pests a pesticidal amount of an aromatic isonitrile as defined in claim 1 wherein A is a naphthyl moiety.

4. A method for combating pests which comprises applying to said pests a pesticidal amount of an aromatic isonitrile of the formula

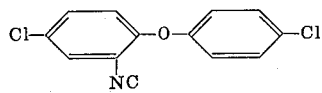

5. A method for combating pests which comprises applying to said pests a pesticidal amount of an aromatic isonitrile of the formula

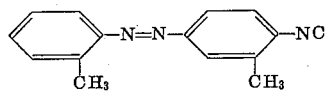

6. A method for combating pests which comprises applying to said pests a pesticidal amount of an aromatic isonitrile of the formula

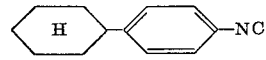

7. A method for combating pests which comprises applying to said pests a pesticidal amount of an aromatic isonitrile of the formula

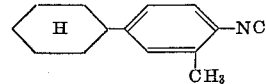

8. A method for combating pests which comprises applying to said pests a pesticidal amount of an aromatic isonitrile of the formula

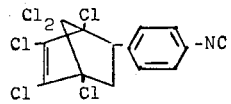

9. A method for combating pests which comprises applying to said pests a pesticidal amount of an aromatic isonitrile of the formula

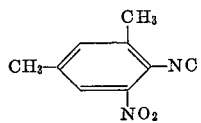

10. A pesticidal composition having as active ingredient a pesticidal quantity of a compound of the formula

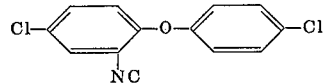

in combination with at least one member comprising a diluent, extender, and emulsifying agent.

11. A pesticidal composition having as active ingredient a pesticidal quantity of a compound of the formula

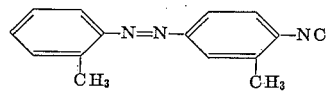

in combination with at least one member comprising a diluent, extender, and emulsifying agent.

12. A pesticidal composition having as active ingredient a pesticidal quantity of a compound of the formula

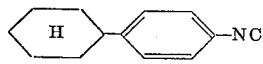

in combination with at least one member comprising a diluent, extender, and emulsifying agent.

13. A pesticidal composition having as active ingredient a pesticidal quantity of a compound of the formula

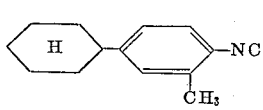

in combination with at least one member comprising a diluent, extender, and emulsifying agent.

14. A pesticidal composition having as active ingredient a pesticidal quantity of a compound of the formula

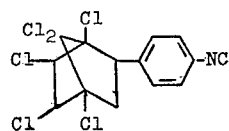

in combination with at least one member comprising a diluent, extender, and emulsifying agent.

15. A pesticidal composition having as active ingredient a pesticidal quantity of a compound of the formula

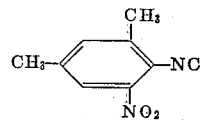

in combination with at least one member comprising a diluent, extender, and emulsifying agent.

References Cited

UNITED STATES PATENTS

| | | | |
|---|---|---|---|
| 3,012,932 | 12/1961 | Bussert | 167—22 |
| 3,164,515 | 1/1965 | Homeyer et al. | 167—30 |
| 3,180,890 | 4/1965 | Enders et al. | 260—566 |
| 3,190,918 | 6/1965 | Holtschmidt | 260—566 |
| 3,201,443 | 8/1965 | Malz et al. | 260—461 |

OTHER REFERENCES

Chem. Abstracts, 60P, 10557g (abstract of Belgium 627, 486, July 24, 1963).

LEWIS GOTTS, *Primary Examiner.*

S. K. ROSE, *Assistant Examiner.*

U.S. Cl. X.R.

260—205, 294.9, 346.2, 465; 424—251, 258, 262, 263, 269, 273, 285, 299, 304